(12) United States Patent
Jordan

(10) Patent No.: US 9,778,134 B2
(45) Date of Patent: Oct. 3, 2017

(54) LEAK DETECTION DEVICE IN JOINTS BETWEEN PIPES WITH FLANGES AND GASKETS

(71) Applicant: PETROENGE PETRÓELO ENGENHARIA LTDA, Macaé (BR)

(72) Inventor: Guilherme Mendes Spitzman Jordan, Macaé (BR)

(*) Notice: Subject to any disclaimer, the term of this patent is extended or adjusted under 35 U.S.C. 154(b) by 114 days.

(21) Appl. No.: 14/418,216

(22) PCT Filed: Feb. 28, 2013

(86) PCT No.: PCT/BR2013/000054
§ 371 (c)(1),
(2) Date: Jan. 29, 2015

(87) PCT Pub. No.: WO2014/019039
PCT Pub. Date: Feb. 6, 2014

(65) Prior Publication Data
US 2015/0268126 A1    Sep. 24, 2015

(30) Foreign Application Priority Data

Aug. 1, 2012   (BR) .......................... 10 2012 019245 4

(51) Int. Cl.
*G01M 3/38*      (2006.01)
*G01M 3/28*      (2006.01)
*G01M 3/40*      (2006.01)

(52) U.S. Cl.
CPC ............ *G01M 3/38* (2013.01); *G01M 3/2853* (2013.01); *G01M 3/40* (2013.01)

(58) Field of Classification Search
CPC .......................... G01M 3/2861; G01M 3/2869
USPC ............................................................. 73/46
See application file for complete search history.

(56) References Cited

U.S. PATENT DOCUMENTS

| | | | | |
|---|---|---|---|---|
| 4,218,926 A | * | 8/1980 | DeVisser ............ | G01L 19/0023 73/730 |
| 4,458,521 A | * | 7/1984 | Pillette .................... | E21B 33/03 73/40.5 R |
| 4,557,139 A | * | 12/1985 | Cantwell ................. | G01M 3/04 73/40.7 |
| 5,209,105 A | * | 5/1993 | Hasha .................... | G01M 3/223 73/46 |
| 7,654,586 B2 | * | 2/2010 | Krausz .................... | F16L 17/04 285/111 |
| 8,410,947 B1 | * | 4/2013 | Graves ...................... | F17D 5/02 340/605 |
| 8,967,185 B2 | * | 3/2015 | Fernandes ............. | F16L 23/006 137/312 |

(Continued)

*Primary Examiner* — Paul West
*Assistant Examiner* — Mark A Shabman
(74) *Attorney, Agent, or Firm* — Nevrivy Patent Law Group P.L.L.C.

(57) ABSTRACT

The present invention relates to a device for detecting leaks of liquids or gases caused by temperature variations, pressure variations, wear on the clamping and coupling devices, wear on sealing devices, by corrosive action, among others, in joints between pipes made by flanges (F) and together and basically comprises a strip (1) to be applied to the region of the "gap" (G) between flanges (F) with a pressure sensor (2) and protective caps (3) adapted to a screw head casing (PE) and nuts (P) employed for mounting between flanges (F).

8 Claims, 10 Drawing Sheets

(56) References Cited

U.S. PATENT DOCUMENTS

| | | | | |
|---|---|---|---|---|
| 2004/0237632 A1* | 12/2004 | Van Keeken | ......... | F16L 23/003 |
| | | | | 73/46 |
| 2007/0113890 A1* | 5/2007 | Woods | .................. | G01M 3/223 |
| | | | | 137/15.11 |
| 2013/0036796 A1* | 2/2013 | Fleury, Jr. | ............... | G01M 3/00 |
| | | | | 73/40.5 R |

* cited by examiner

LEAK DETECTION DEVICE IN JOINTS BETWEEN PIPES WITH FLANGES AND GASKETS

FIELD OF THE INVENTION

The present invention finds its scope among devices for leak detection of liquids or gases in joints between pipes. More particularly, in the detection of leaks of flanges and gaskets in joints between pipes caused by temperature changes, pressure changes, wear of clamping and coupling devices, wear of sealing devices, or by corrosive action, among others. More specifically, a device for detecting leaks via recording of internal pressure within the joint between pipes and the indication of this anomaly by means of physical perception and electronics.

STATE OF THE ART

The problems resulting from the corrosion of metallic structures, which can be caused naturally by atmospheric action where oxygen reacts strongly on ferrous materials and forms iron oxide, after the first occurrence, may be aggravated by other weather conditions in which these structures may be exposed. The continuity of a corrosive process without control or prevention can leave a structure in a state of collapse with serious consequences.

All industries use liquids and gases at some point in their production process. These fluids are transported by transport pipeline.

The pipes may interconnect equipment protected inside areas constructed in a factory, for example, or may be extensive, as in the transport of water or oil, and be subjected to the more immediate action of weather or environmental conditions, such as winds which may displace topsoil.

These pipes are formed by sections of pipe which require a mechanical connection between the sections in order to cover the extent necessary to transport the fluid. The union can be made by welding, threading or by mechanical joining, depending on the design of the piping.

The most common type of mechanical joint is made by joining with fasteners, using two members incorporated into the ends of pipeline segments known to practitioners by the term "FLANGE" which will be adopted in this report hereafter. The union between flanges at each end of each pipe segment allows for a more practical construction of the transporting pipes, the interposition of valves and other equipment, as well as dismantling of the latter in case of replacement.

It is at this junction between flanges that leaks often occur, more specifically in the region of the small space between the faces of the flanges. This small space is known among practitioners by the term "GAP" which will be adopted hereafter. Another possibility of leakage may occur in the union of a flange element with the tubular element, in this case, a union generally carried out by welding.

Current techniques for monitoring flange leaks generally employ detection procedures which use sophisticated technological resources embedded in the equipment, most being of the portable type, which depend on human handling for use in the field. This type of inspection routine, which adopts a range of programming and requires skilled labor, can allow detection of a leak in a union which occurs too late.

Usually, when this situation occurs, there is an urgent need to interrupt the flow through that pipe with emergency stop production equipment, that is, if an accident has not already taken place.

The losses are huge both in terms of equipment that may be damaged due to a critical stop, as well as in lost products or even involved personnel.

Adopted procedures or developed equipment do not always produce the expected effects.

Many devices have been developed so as to be installed over or adjacent to joints between pipes. A large part of such equipment and devices serves almost exclusively for only a physical state of fluid: gas or liquid. For example, in the case of a fluid flow, the devices typically comprise small "tracks" made of metal, usually copper strips secured on a substrate which is applied around a flange. These "tracks" are fed by a given electric current.

When the leaking fluid reaches both bands, it closes an electrical circuit which provides a signal that the leak has occurred at that location. However, all involved electronics and electrical supply must be located off the flange. This is not always possible, especially in a scenario of a floating production platform, where spaces need to be carefully planned and there is almost no free space for implementing these solutions along the onboard production plant.

In this case, gas sensors which are known by the term "sniffer" are usually used which are calibrated to sense the presence of a given gas.

The technique still suffers from a solution for detecting leaks of liquids, gases or vapors, hot or otherwise, in pipes joined by means of flanges, which is of low cost and low complexity, but which offers high efficiency even with minimal pressure variations caused by leaks. Additionally, one must have the ability to acknowledge, record and indicate the occurrence of a leak in the exact location of the latter, or to remotely transmit the signal to a control center.

SUMMARY OF THE INVENTION

The device of the present invention deals with the detection of leaks of liquids or gases caused by temperature variations, pressure variations, wear on the clamping and coupling devices, wear on sealing devices by corrosive action, among others, in joints between pipes constructed with flanges and gaskets.

The device of the present invention detects leaks by recording the pressure inside the joint between the flanges of pipes, "gap," and the indication of this anomaly by means of visual perception, or by electronic means.

The device basically comprises:
(I) a strip to be applied to the region of the "gap" between flanges fabricated with a modified silicone composition and a substantially porous substrate in its interior and with an orifice along its length;
(Ii) a leak sensor which operates through pressure variation to be adapted with a hermetic seal at the orifice of the strip, and
(Iii) caps with flat extensions at the end, flush with the wall of the flange, which are adapted to the screw head case and nuts used in the fastening between the flanges, so that they provide equally airtight seals in these regions of the flanges.

With these regions hermetically sealed, any pressure change, however small, is capable of immediately activating the device detector, reliably and in a timely manner, so that the necessary steps are taken without risk.

BRIEF DESCRIPTION OF THE FIGURES

The characteristics of the device for detecting leaks in joints between pipe flanges and gaskets for the object of the present invention, will be better perceived from the detailed description which will hereinafter, by mere way of example, be associated with the drawings referenced below which are integral parts of this report.

DETAILED DESCRIPTION OF THE INVENTION

Figure 1:
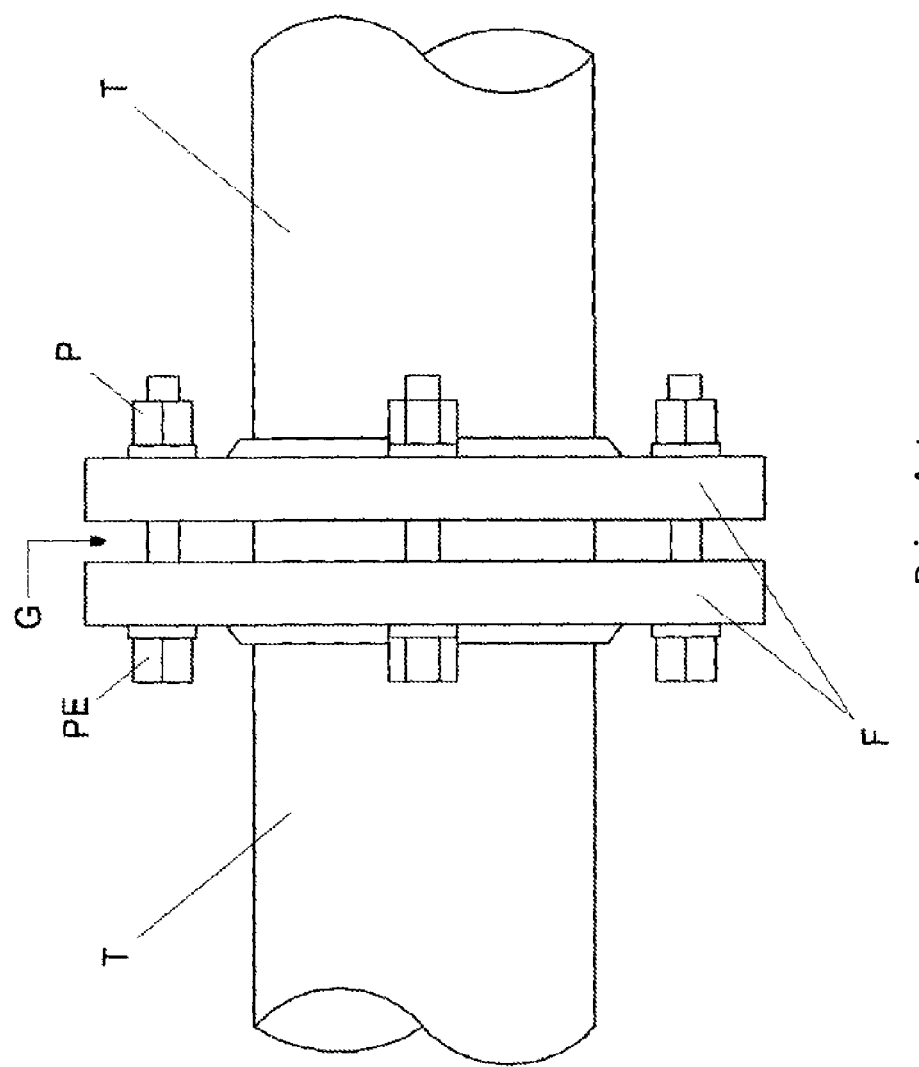
FIG. 1 shows a representation of a typical mechanical gasket for the seal between pipeline segments by means of fixing flanges.

The object of the present invention provides a detailed description of the leak detection device in joints between pipes, by means of flanges and gaskets, and will be made in accordance with the identification of components that form the basis of the Figures described above.

From this point on, the facilities of an oil rig at sea will be adopted as a scenario only by way of example. However the universe of application for all items of the present invention is not limited to this scenario, since there are aqueducts, pipelines, oil flow lines and other piping exposed to the weather, or internal constructions in which the joints between flanges must be inspected.

The facilities of an oil rig were chosen because they are under the influence of a harsh environment where, in addition to weather conditions, these facilities also suffer from the action of potentially corrosive gases, salt spray and the intense action of ultraviolet rays.

As previously stated, adopted procedures or developed equipment do not always produce the expected effects.

There is a multitude of equipment and devices in the art which function based on a variation of pressure in the region of the "gap" to detect a leak.

In reality, the detection efficiency of these devices is very low.

Efficiency is placed under suspicion, since leakage occurs in this region through the flange holes where the screw cases are adapted, usually without any sealing. It must be remembered that the detection efficiency for liquids is great, but the potential for dangerous levels of gasses is very high.

Without a seal provided in the region of the screw case, a pressure will be generated which is perceived by the equipment only when the flow of leakage is greater than the fluid flow permitted through the holes of the flanges. Until this leakage is sensed and recorded, much of the fluid has already spread to the environment and can cause very serious accidents in the form of potentially explosive or toxic gasses.

In order to record a leak in these situations, it is necessary for the sensitivity of such equipment or devices to be very high, with a very advanced means of perception in technological terms, urging the formation of a detection system for an entire operating plant which has a plethora of seals between pipes.

The object of the present invention discloses a device for the detection of leaks in pipe joints with flanges and gaskets, presenting as its main advantage a simple construction, while at the same time conferring a tight seal in the region between the flanges.

Due to its construction characteristics and application, a minimal leakage within the union between flanges is sufficient to generate a positive pressure capable of triggering a sensor, which can acknowledge the occurrence of this minimum pressure almost immediately.

This registration immediately allows all preventive measures in relation to the interruption of fluid flow, the safe stopping of production equipment, and even adoption of procedures in relation to the withdrawal of individuals working near the site of occurrence to be carried out in minimum time.

Before the device of the present invention for leak detection is described, it is necessary to mention that some of its components are based on some compositions based on modified silicone, which have already been protected by privilege invention request BR 2010/0074377 filed on Aug. 12, 2010 by the same Applicant of this current request.

A first composition from the above mentioned which will always be referenced throughout this report is the term "modified silicone elastomer" comprising a physical mixture of a commercial silicone elastomer in the form of paste with 7.0 to 13.0 w/w oximosilano (CAS 22984-54-9) and 1.0 to 5.0 w/w aminopropyl triethoxy silane (CAS 919-30-2).

A second composition which will always be referenced throughout this report is the term "modified silicone grease" which comprises a physical mixture of commercial silicone grease (P928-10 LUB) with 93.0 to 97.0 w/w polydimethyl siloxane (CAS 63148-62-9), 2.0 to 5.0 w/w inorganic filler (CAS 112945-52-5) and 0.1 to 0.5 w/w stabilizing additives (CAS 68037-64-9).

With the aid of FIG. 1, a typical mechanical joint between sections is observed (T), held by the pipe coupling and fixed by the screw case set (PE) and nuts (P) between two flanges (F) existing at the ends of each one of these sections (T) as well as the gap (G), in the space between flanges (F).

Figure 2:
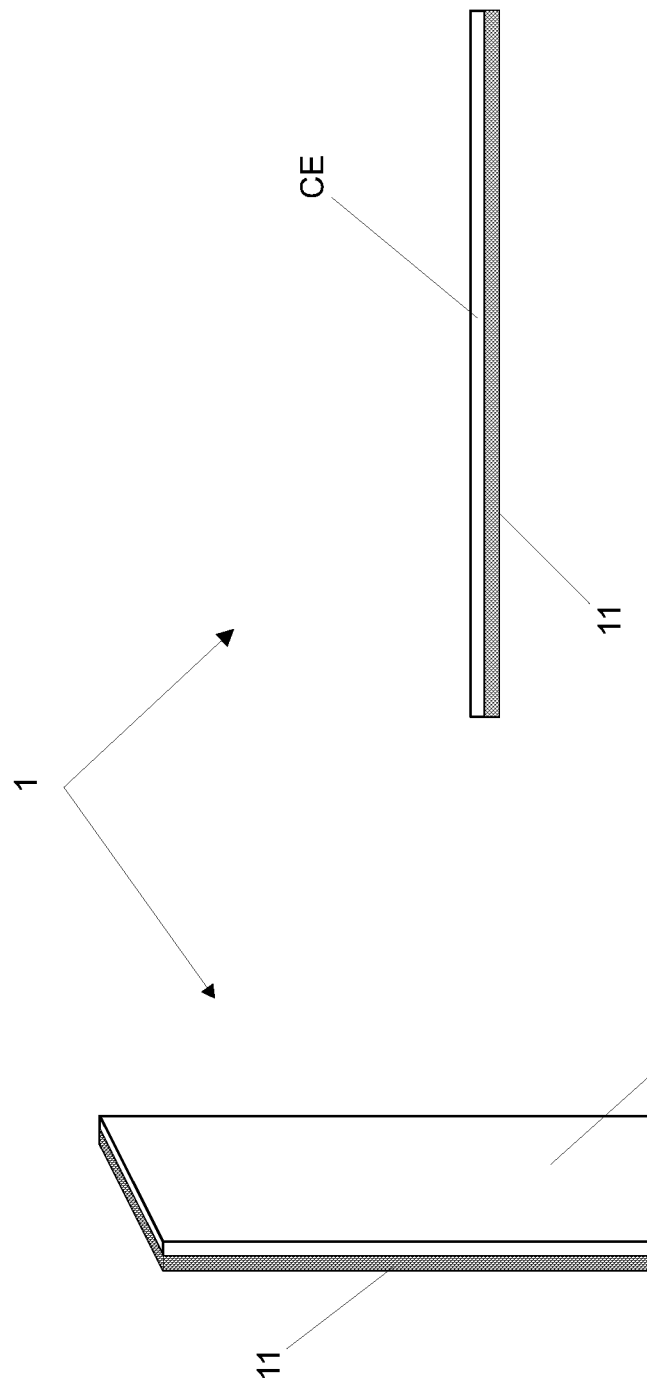
FIG. 2 shows a representation of a first embodiment of the detector strip of the present invention.
Figure 3:
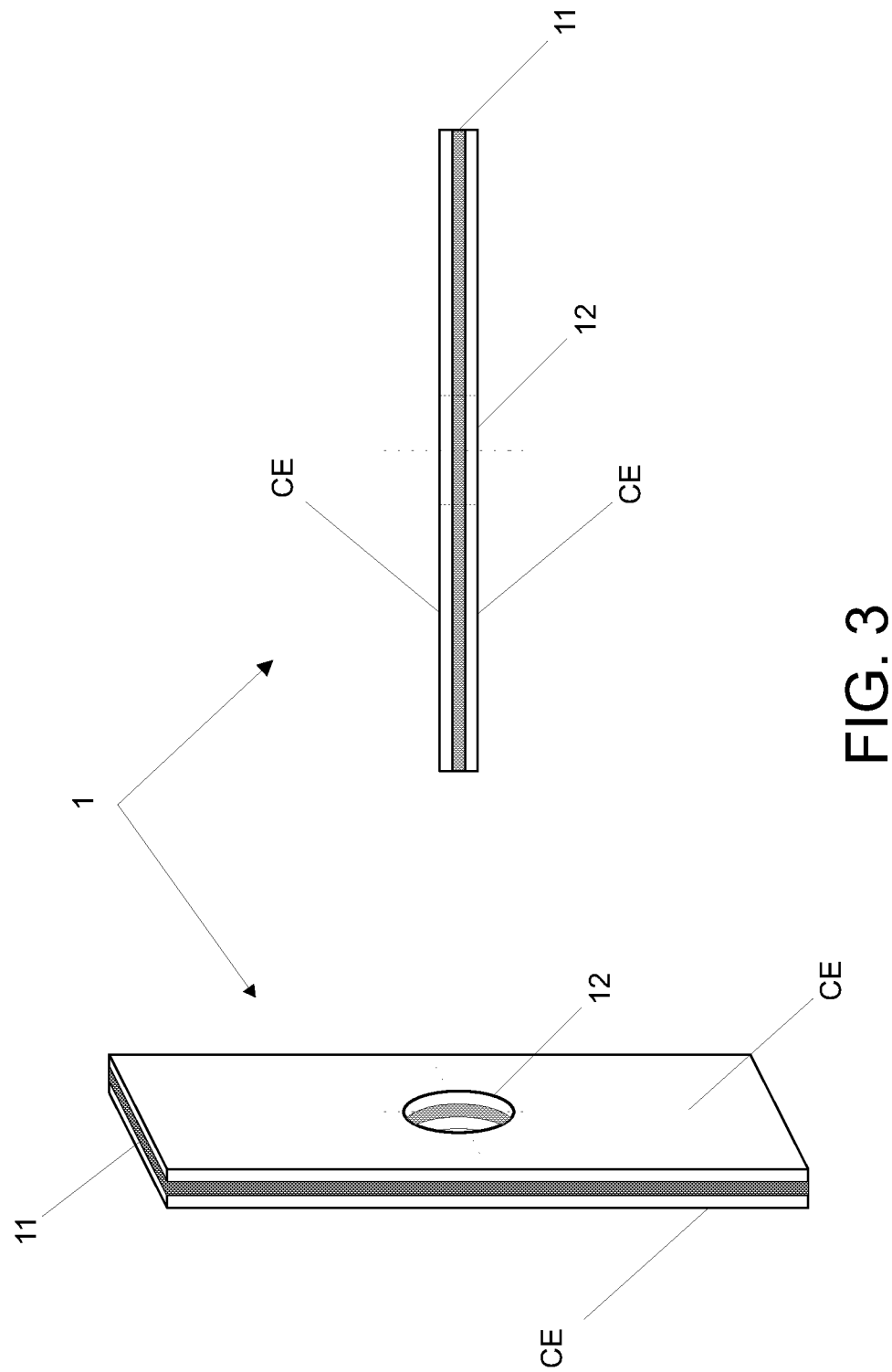
FIG. 3 shows a representation of a second embodiment of the detector strip of the present invention.
Figure 4:
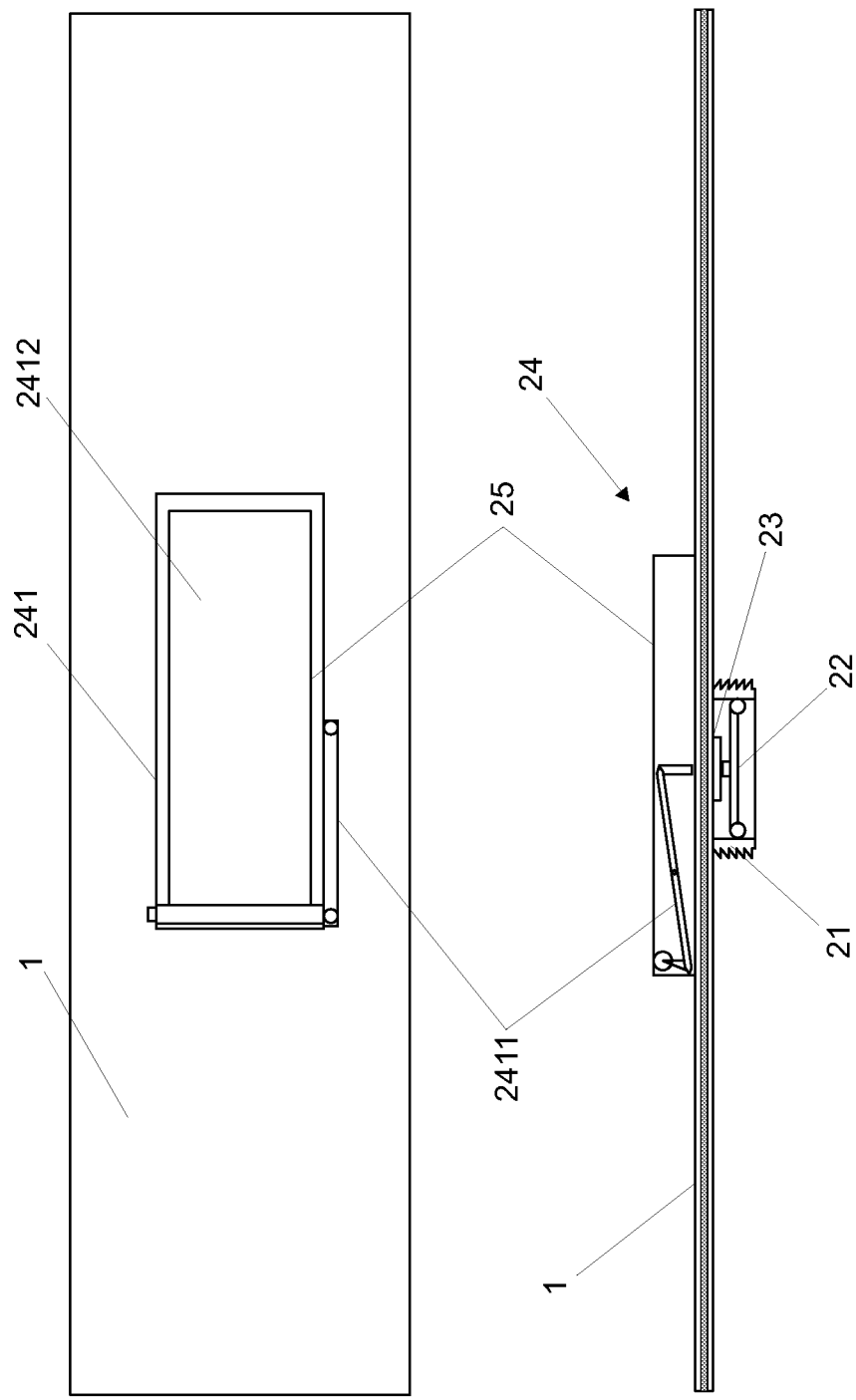
FIG. 4 shows a representation of an embodiment of a mechanical detector recorder of the present invention.
Figure 5:
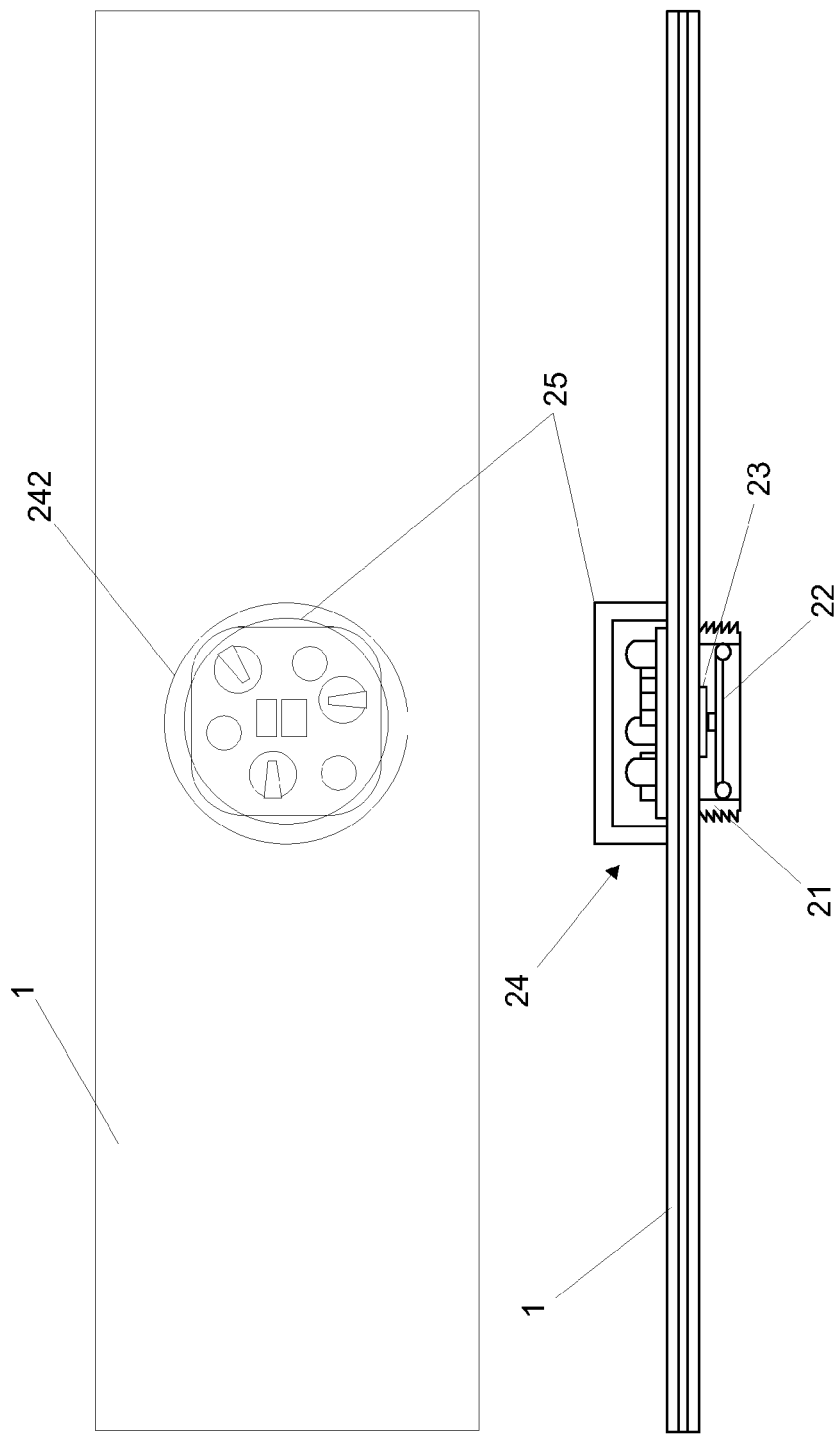
FIG. 5 shows a representation of the general appearance of an electric recorder adapted to the detector strip of the present invention.
Figure 6:
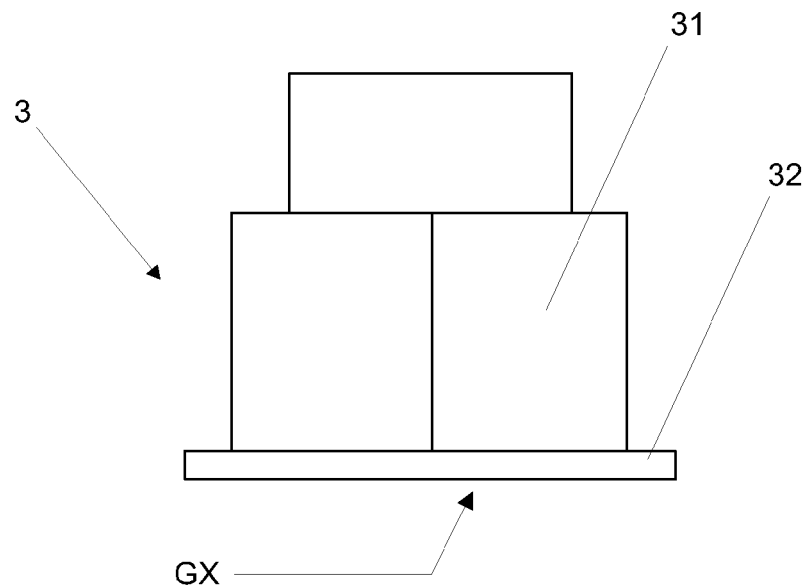
FIG. 6 shows a representation of the protective caps for the detector of the present invention.
Figure 6:
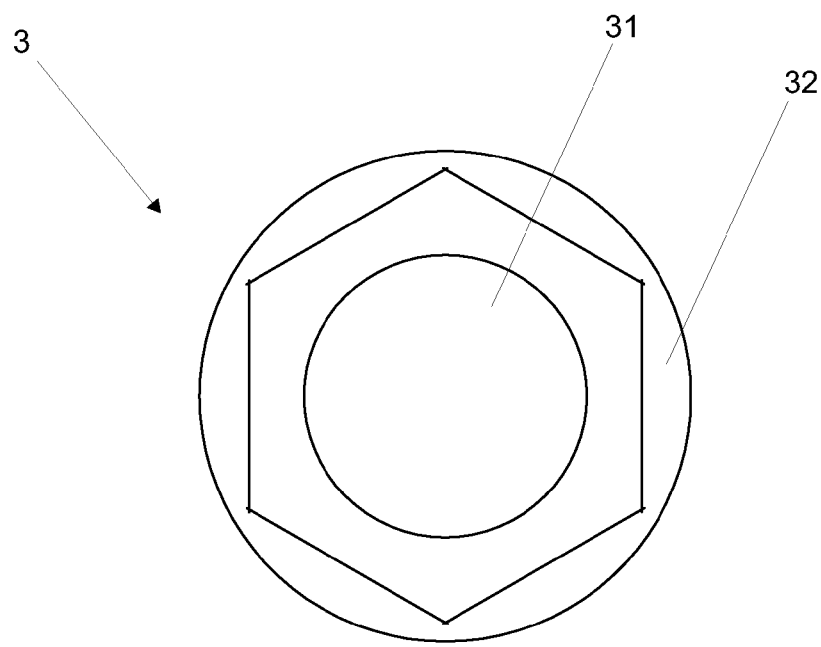

The leak detection device in joints with flanges and gaskets of the present invention comprises:

a strip (1), which can be seen in more detail in FIGS. 2 and 3, made of a substantially flexible and porous laminar substrate (11), covered by at least one layer (CE) of a modified silicone elastomer, (1) serving to cover the entire surface of the joint between the flanges (F) and the gap (G) and, additionally, can have an orifice (12) (FIG. 3) located at a point of length and centered in relation to the width of the strip (1);

a pressure sensor (2), which can be seen in more detail in FIGS. 4 and 5, to be fixed in the orifice (12) of the strip (1) which serves to record the minimum pressure change which occurs between flanges (F) and is formed by a substantially cylindrical base (21) in the interior which has a firmly bonded membrane (22) of resilient material resistant to corrosive fluids, with a trigger (23) above the latter, which is connected to a recorder (24)

which may be chosen from a mechanical type (241) having an electronic circuit (242) and a cover (25) which is firmly fixed to a protective base (21) isolating the internal components from the environment;

protective caps (3), which can be seen in FIG. 6, in sufficient number to cover the screw head cases (PE) and nuts (P) made of resistant plastic materials plus a load of UV protection, consisting of a fitting body (31) and a hollow hexagonal on its open end integrally joined as an extension of the latter, a flat surface shaped flap (32), substantially circular and exceeding the dimensions of the fitting body (31) and covered internally by a modified silicone grease (GX).

A first embodiment of the strip (1), FIG. 2 shows a laminar substrate (11) coated on only one of its surfaces by a layer (EC) of modified silicone elastomer where this substrate is dipped in a chemical capable of reacting to a given compound which flows inside the pipe and at the leak, which causes the chemical substance and the substrate to change color.

A second embodiment of the strip (1), FIG. 3 shows a laminar substrate (11) coated on both surfaces with a layer (EC) of modified silicone elastomer and the orifice (12) for fixing the pressure sensor (2).

The substrate (11) is preferably made of non-woven felt.

The protective cover (25) is preferably made of polycarbonate.

The membrane, which is made of resilient material and resistant to corrosive fluids, (22) is a synthetic rubber known by the trade name "Viton" registered to "DuPont Performance Elastomers LLC."

The embodiment of a recorder (24) of the mechanical type (241) (FIG. 4) comprises an arm (2411) connected to the trigger (23) and integrated into the protective cap (25), which has a colored indicator (2412), for example, a small colored sheet, so that the membrane (22) flexed by the pressure effect pushes the trigger (23) which drives the arm (2411) that moves the colored indicator (2412), changing the visual record to a different color from the original color, indicating an abnormal situation.

Figure 7:
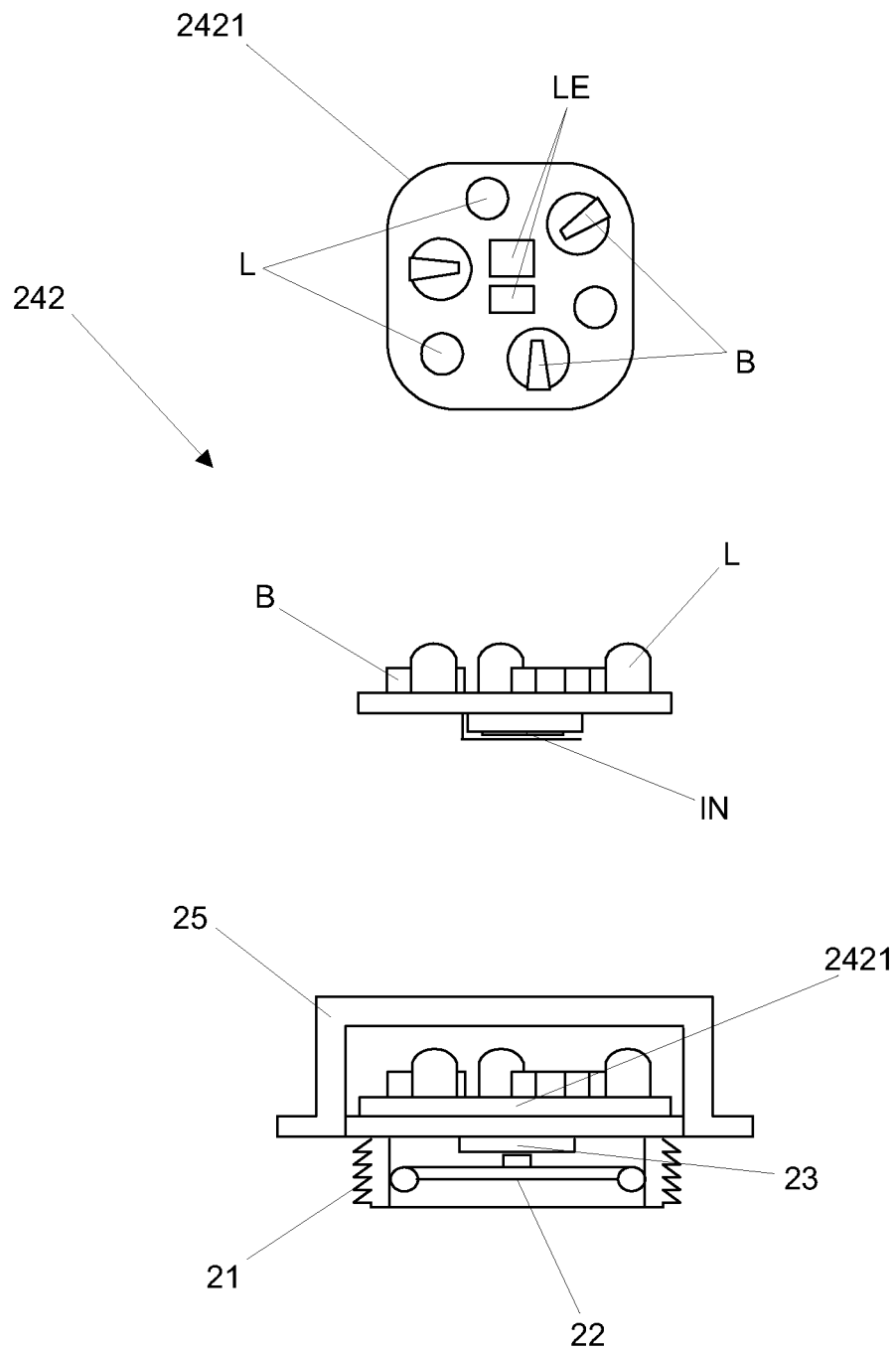
FIG. 7 shows a representation of an electric light detector recorder of the present invention.
Figure 8:
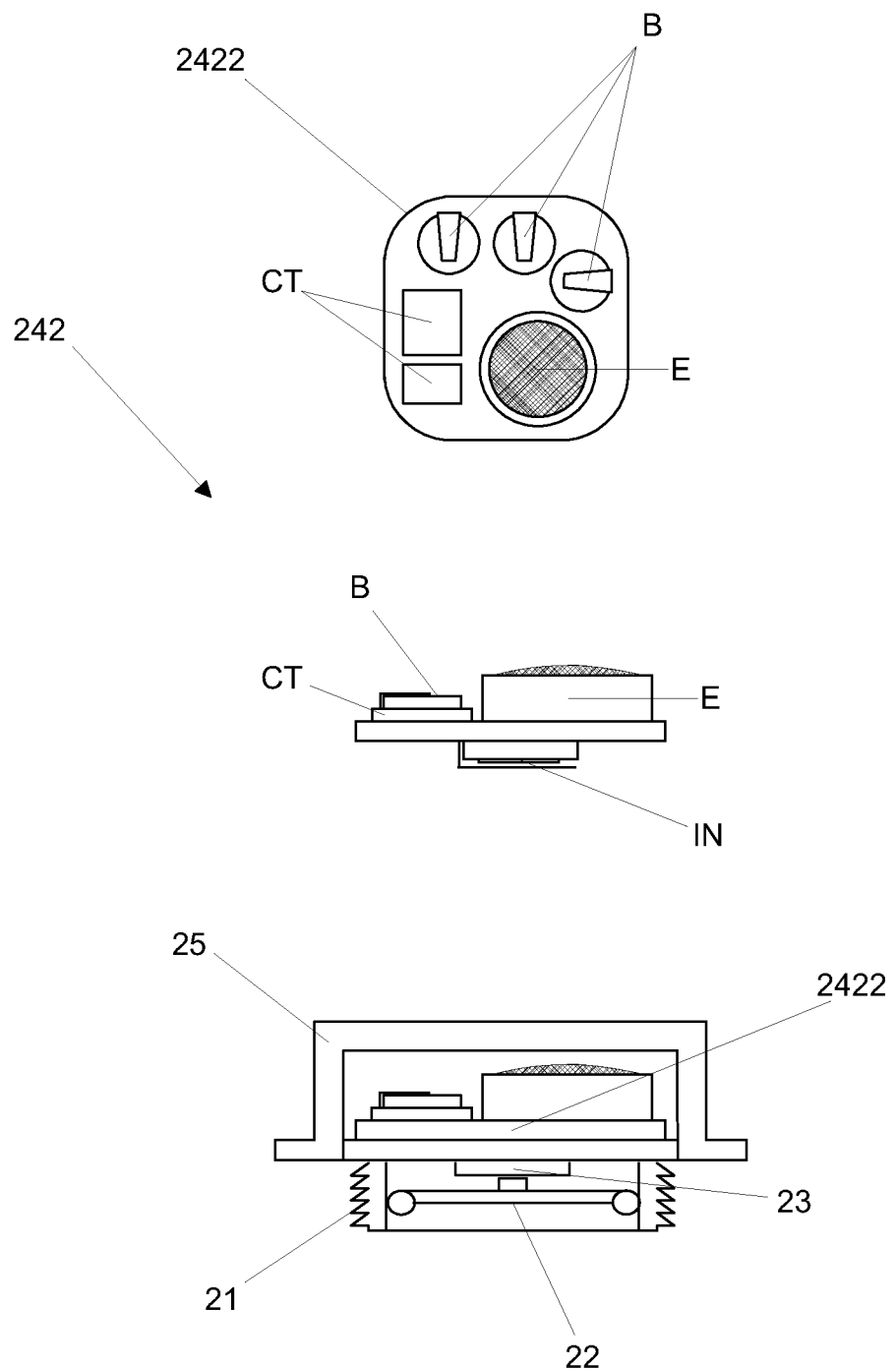
FIG. 8 shows a representation of an electric recorder detector transmitter of the present invention.

The embodiments to the recorder (24) of the electronic circuit type (242) are shown in FIG. 5 and can generally be chosen from the following modalities:

luminous (2421) (FIG. 7), which comprises a small stroboscopic circuit (CO) powered by mini batteries (B) and a switch (IN) connected to the trigger (23) so that the membrane (22), flexed by a pressure effect, pushes the trigger (24) and the switch (IN) which closes the electric circuit of the mini battery (B) and intermittently illuminates a set of light emitting diodes (L) for the effect of programming the small stroboscopic circuit (LE);

transmitter (2422) (FIG. 8) comprising a small radio frequency transmission circuit (CT) powered by a mini battery (B) and a switch (IN) connected to the trigger, (23) so that the membrane (22) being flexed by pressure, pushes the trigger (24) and the switch (IN) which closes the electric circuit of the mini battery (B) and powers the small transmission circuit (CT) which is transmitted through an emitter, (E) sending radio frequency signals which are picked up remotely by a central station (CR).

Both the strip (1) with the pressure sensor (2) as well as the protective caps (3), are fixed in their places of installation by cords of modified silicone elastomer which is not yet cured.

The strip (1) with the pressure sensor (2) have their principal dimensions on the various types of mechanical joints in which they are employed where the length of the strip (1) is dependent on the perimeter of the flanges (F) and the width of the strip (1) is dependent on the opening of the "gap" (2) thereby allowing an adjustment to a precise length and width without the possibility of gaps or overlapping ends when installed.

The protective caps (3) are manufactured in sizes compatible with screws and nuts on the market.

Figure 9:
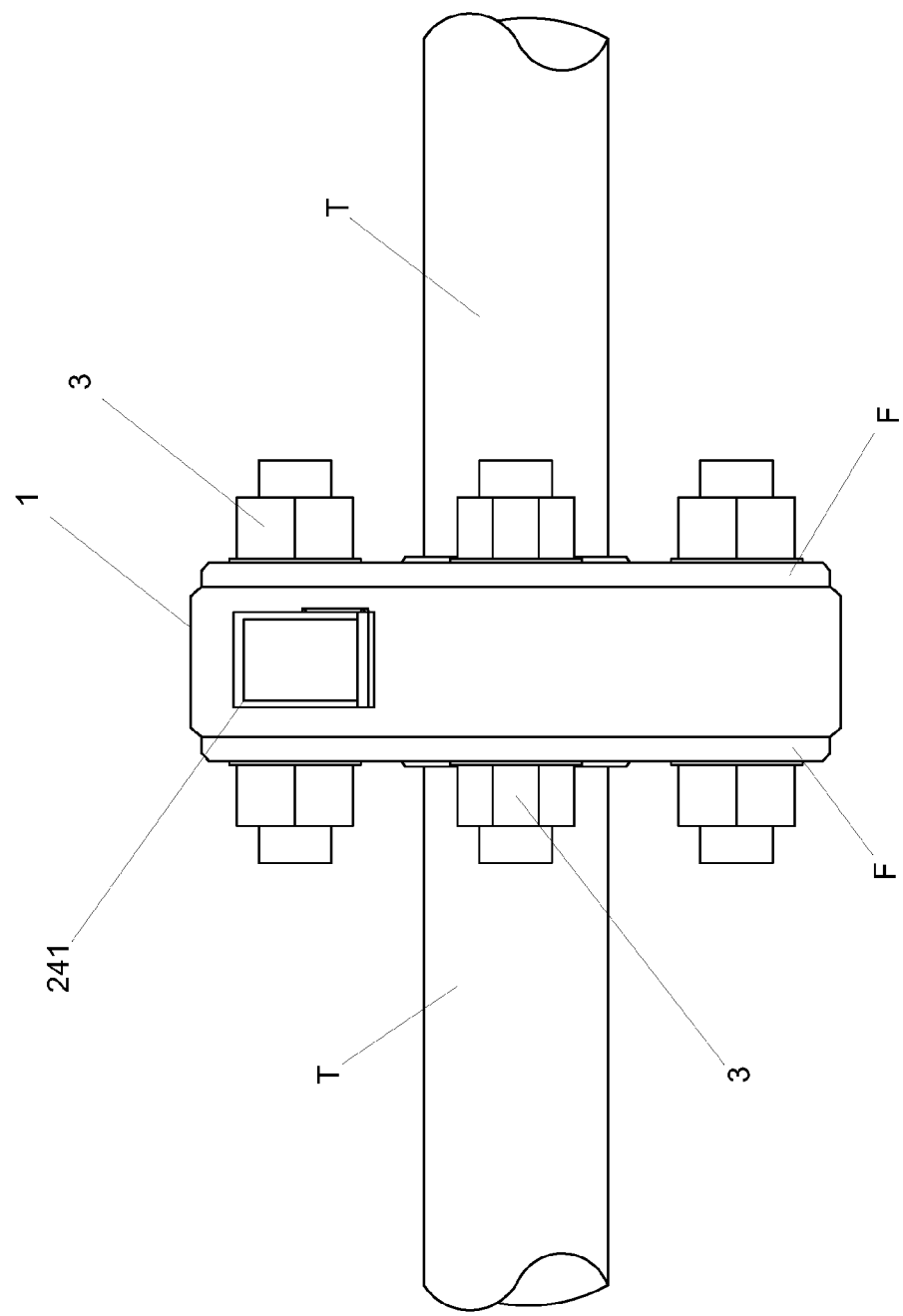
FIG. 9 shows a representation of the leak detection device with the implementation of the mechanical recorder adapted to a typical mechanical joint between sections of pipe.

FIG. 9 shows the leak detection device with the mechanical embodiment of the recorder (241) adapted in a typical mechanical joint between sections (T) of pipe.

Figure 10:
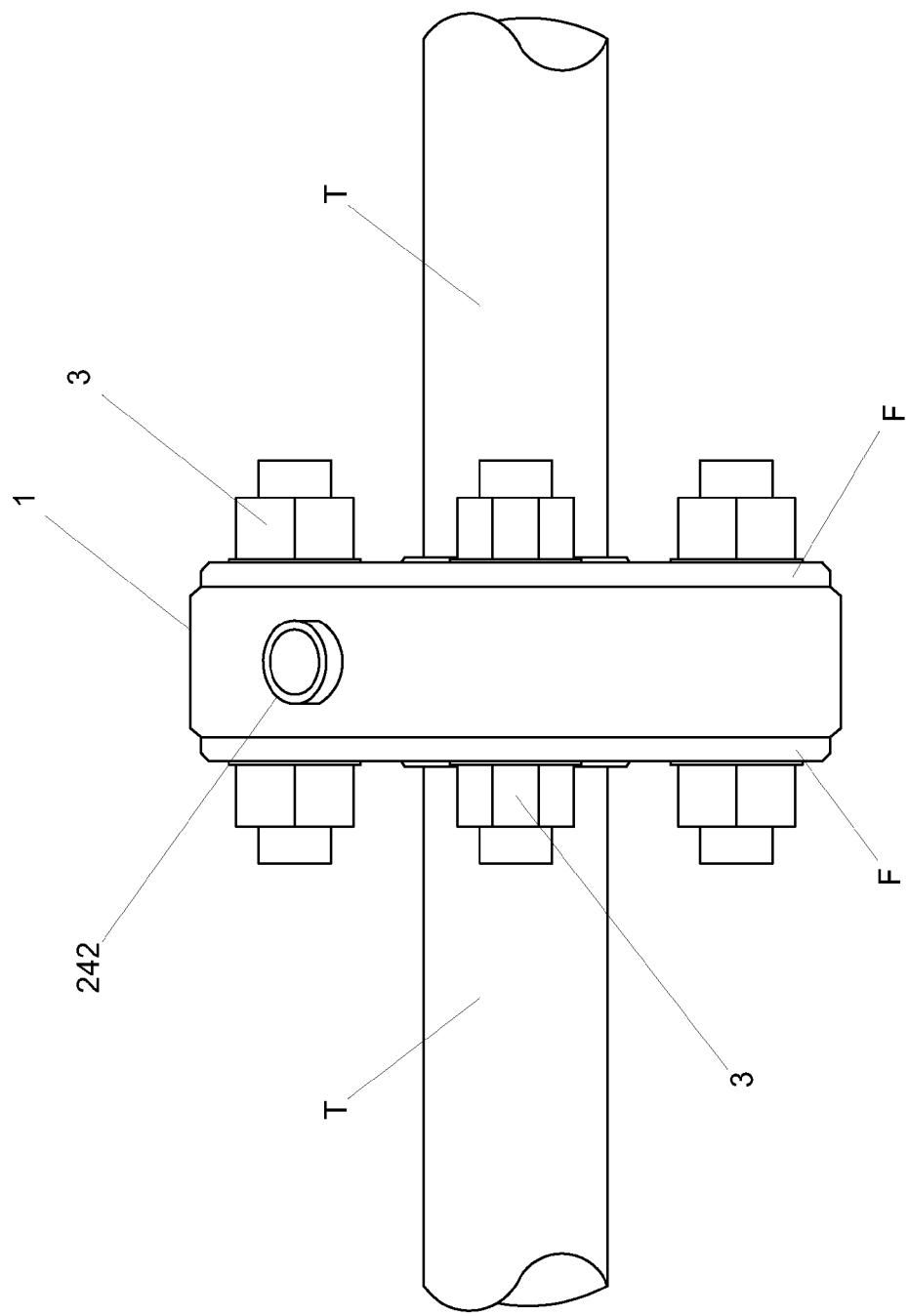
FIG. 10 shows a leak detection device with the implementation of the electric recorder adapted to a typical mechanical junction between sections of pipe.

FIG. 10 shows the leak detection device with the embodiment of the electric recorder (242) adapted in a typical mechanical joint between sections of (T) pipe.

Although the present invention has been described in its preferred embodiment, the main concepts guiding the present invention, which is a device for detecting leaks in joints between flanges and gaskets, remain preserved as to its innovative character, usually where those who are skilled in the art may discern and practice variations, modifications, alterations, adaptations, and reasonable equivalents applicable and compatible to the working environment in question, without however, departing from the scope of the spirit and scope of the present invention represented by the following claims.

The invention claimed is:

1. A leak detection device in joints between pipes with flanges and gaskets for use in leak detection of liquids or gases caused by temperature changes, pressure changes, wear of clamping and coupling devices, wear on sealing devices, or by corrosive action characterized in that:

a strip made of a substantially porous laminar substrate covered by at least one layer of a modified silicone elastomer strip serving to cover an entire surface of a joint between the flanges and a gap, and additionally, having an orifice located at a point along the length and centered in relation to the width of the strip;

a pressure sensor fixed in the orifice of the strip which serves to record the minimum pressure change which occurs between flanges and is formed by a substantially cylindrical base which has a bonded membrane of resilient material and resistant to corrosive fluids, with a trigger adjacent to the membrane, which is connected to a recorder which is one of a mechanical type and having an electronic circuit and a cover which is fixed to the base isolating the internal components from the environment;

protective caps, to cover screw head cases and nuts (P), made of plastic materials plus a load of UV protection, consisting of a fitting body wherein the protective caps have a hexagonal shape and an open end, a flat surface shaped flap, substantially circular and exceeding the dimensions of the fitting body and covered internally by a modified silicone grease.

2. The leak detection device according to claim 1 wherein the strip has a foil substrate coated on only one of its surfaces by a layer of modified silicone elastomer and where this substrate is coated with a chemical capable of reacting to a compound that flows inside the pipe and at the leak, which causes the chemical substance and the substrate to change color.

3. The leak detection device according to claim 1 wherein the strip has a foil substrate coated on the larger planar surfaces by a layer of modified silicone elastomer.

4. The leak detection device according to claim 1 wherein the recorder mechanism is comprised of an arm connected to the trigger and integrated into the cover, which has a colored indicator, so that the membrane flexed by the effect of pressure pushes the trigger which drives the arm and moves the colored indicator, changing the visual record to a different color than the original color, indicating a state of abnormality.

5. The leak detection device according to claim 1 wherein the recorder of the electronic circuit type is selected from the group consisting of:
  a luminous type, comprising a small stroboscopic circuit powered by a battery and a switch connected to the trigger, so that the membrane, being flexed by the effect of pressure pushes the trigger and the switch which closes the electric circuit of the battery and intermittently illuminates a set of light emitting diodes for the effect of programming the small stroboscopic circuit; and
  a transmitter type, comprising a small radio frequency transmission circuit powered by a battery and a switch connected to the trigger, so that the membrane being flexed by pressure, pushes the trigger and the switch which closes the electric circuit of the battery and powers the small transmission circuit and radio frequency signals are transmitted through an emitter, which are picked up remotely by a central station.

6. The leak detection device according to claim 1 wherein the substrate is made of non-woven felt, the protective cover, is made of polycarbonate, protective caps made of hard plastic are polyvinyl chloride with the membrane being made of synthetic rubber.

7. The leak detection device according to claim 1 wherein both the strip with the pressure sensor and protective caps, are fixed in their places of installation by means of modified silicone elastomer cords which are not yet cured.

8. The leak detection device according to claim 1 wherein the length of the strip is dependent on the perimeter of the flanges and the width of the strip is dependent on the opening of the gap and thereby allows an adjustment to a precise length and width without the possibility of gaps or overlapping ends when installed.

* * * * *